(12) United States Patent
Tofilescu et al.

(10) Patent No.: US 11,174,665 B2
(45) Date of Patent: Nov. 16, 2021

(54) CAMERA BASED HANDS-FREE POWER LIFT GATE

(71) Applicants: Pompilian Tofilescu, Scarborough (CA); Sandor Zsombory, Richmond Hill (CA); Yarko Matkiwsky, Whitby (CA); Reginald C. Grills, Oshawa (CA); Adam Mack, Newmarket (CA)

(72) Inventors: Pompilian Tofilescu, Scarborough (CA); Sandor Zsombory, Richmond Hill (CA); Yarko Matkiwsky, Whitby (CA); Reginald C. Grills, Oshawa (CA); Adam Mack, Newmarket (CA)

(73) Assignee: FLEX LTD., Singapore (SG)

( * ) Notice: Subject to any disclaimer, the term of this patent is extended or adjusted under 35 U.S.C. 154(b) by 44 days.

(21) Appl. No.: 15/966,515

(22) Filed: Apr. 30, 2018

(65) Prior Publication Data
US 2019/0330908 A1    Oct. 31, 2019

(51) Int. Cl.
*B60R 25/24* (2013.01)
*B60R 25/01* (2013.01)
(Continued)

(52) U.S. Cl.
CPC ............ *E05F 15/73* (2015.01); *B60Q 1/0076* (2013.01); *E05F 15/76* (2015.01); *G06K 9/00335* (2013.01); *H04N 5/23219* (2013.01); *H04N 5/23241* (2013.01); *B60J 5/101* (2013.01); *E05F 2015/767* (2015.01)

(58) Field of Classification Search
None
See application file for complete search history.

(56) References Cited

U.S. PATENT DOCUMENTS

| 6,142,551 A | 11/2000 | Ciavaglia |
| 9,470,033 B1 | 10/2016 | Dudar |

(Continued)

FOREIGN PATENT DOCUMENTS

| WO | 2014089696 A1 | 6/2014 |
| WO | 2016088359 A1 | 6/2016 |

OTHER PUBLICATIONS

Office of Vehicle Safety Compliance, U.S. Department of Transportation National Highway Traffic Safety Administration Laboratory Test Procedure for FMVSS 111 Rear Visibility, Feb. 8, 2018, Washington, DC, USA.

*Primary Examiner* — Adam D Tissot
*Assistant Examiner* — Laura E Linhardt
(74) *Attorney, Agent, or Firm* — Volpe Koenig

(57) ABSTRACT

A method and system for a camera based hands free power liftgate is described herein. The system may power on following a key approach and/or the doors unlocking and then initialize. If there is an approach detected, the lights may be activated and the gesture detection feature of the system may then determine whether a gesture was detected. If a gesture was detected, the liftgate may then be activated. If no gesture was detected, the lights may be activated. For example, if there is a key approach, the system may power and initialize. The system may then determine whether an approach is detected. If an approach is detected, lights of the vehicle may activate and a determination whether a gesture is detected is made. If a gesture is detected, a liftgate of the vehicle may be activated.

22 Claims, 4 Drawing Sheets

(51) Int. Cl.
  *G07C 9/00*      (2020.01)
  *G06K 9/00*      (2006.01)
  *G01S 7/521*     (2006.01)
  *F21S 41/143*    (2018.01)
  *F21S 41/265*    (2018.01)
  *E05F 15/73*     (2015.01)
  *H04N 5/232*     (2006.01)
  *B60Q 1/00*      (2006.01)
  *E05F 15/76*     (2015.01)
  *B60J 5/10*      (2006.01)

(56) References Cited

U.S. PATENT DOCUMENTS

| | | | |
|---|---|---|---|
| 10,329,829 B2 | 6/2019 | Matsui et al. | |
| 2004/0046409 A1* | 3/2004 | Hirai | E05B 83/16 |
| | | | 296/76 |
| 2015/0127193 A1* | 5/2015 | Tofilescu | B60R 25/2054 |
| | | | 701/2 |
| 2016/0083995 A1* | 3/2016 | Dezorzi | E05F 15/73 |
| | | | 340/5.72 |
| 2016/0281410 A1 | 9/2016 | Schanz et al. | |
| 2016/0323484 A1* | 11/2016 | Moenig | H04N 5/2257 |
| 2017/0009509 A1 | 1/2017 | Ryu et al. | |
| 2017/0190314 A1* | 7/2017 | Ette | B60Q 1/503 |
| 2018/0236929 A1* | 8/2018 | Gocke | F21S 41/265 |
| 2019/0031146 A1* | 1/2019 | Etonye | B60R 1/04 |
| 2019/0122056 A1* | 4/2019 | Tran | G01S 15/88 |
| 2019/0217778 A1* | 7/2019 | Swain | E05F 15/71 |
| 2019/0256049 A1* | 8/2019 | Jawany | G07C 9/00309 |

* cited by examiner

CAMERA BASED HANDS-FREE POWER LIFT GATE

FIELD OF INVENTION

The present disclosure relates to a camera for use in automotive applications including but not limited to rear-view cameras, and more particularly to methods and apparatus for opening and closing a liftgate based on camera based gesture recognition.

SUMMARY

A method and system for a camera based hands free power liftgate is described herein. The system may power on following a key approach and/or the doors unlocking. The system may then initialize. The approach detection feature of the system may then determine whether an approach was detected. If there is an approach detected, the lights may be activated and the gesture detection feature of the system may then determine whether a gesture was detected. If a gesture was detected, the liftgate may then be activated. If no gesture was detected, the lights may be activated.

Under an approach, the system may power and initialize. The system may then determine whether an approach is detected. When an approach is detected, lights of the vehicle may activate and a determination whether a gesture is detected is made. On a condition that a gesture is detected, a liftgate of the vehicle may be activated.

DETAILED DESCRIPTION

There has been a proliferation of camera technology in consumer devices such as cellular phones and computing devices. Automobile manufacturers have increasingly included cameras as a standard or optional feature for benefits including but not limited to enhancing vehicle safety, improving vehicle maneuverability, and providing convenience to the vehicle driver. Due to a rear-view camera's ability to prevent back over accidents and thereby reduce fatalities and serious injuries caused by those accidents, the National Highway Traffic Safety Administration (NHTSA) will require all new vehicles under 10,000 pounds to include rear visibility technology by May 2018. Accordingly, there is a need for cost effective designs for rear visibility technology in order to comply with NHTSA regulations.

The embodiments described herein are generally directed to a system and method of activating a vehicle liftgate. Specifically, the embodiments are directed to a gesture method, which may include a control gesture that is a non-contact "press" of the rear view camera using a hand, carried object, or other body part. The embodiments described herein include features including but not limited to approach monitoring, cross traffic detection, flare/AEC detection, gesture recognition, gesture timeout, initialization control, and a user feedback system. The embodiments described herein include tunable parameters including but not limited to approach sensitivity, approach time, approach region of interest, gesture sensitivity, gesture time, gesture region of interest, initialization sensitivity, initialization time, process sensitivity, process learning rate, and process unlearning rate. Example tunable parameter values are shown in Table 1 below:

TABLE 1

| Example Tunable Parameters | | |
|---|---|---|
| Parameter | Range | Current Value |
| Approach Time | 10 ms-1000 ms | 700 ms |
| Gesture Time | 20 ms-1000 ms | 700 ms |
| Gesture Timeout | 500 ms-5000 ms | 2000 ms |
| Initialization Time | 250 ms-3000 ms | 1000 ms |
| Learning Rate (0-max) | 100 ms-3000 ms | 1000 ms |
| Learning Rate (max-0) | 100 ms-3000 ms | 1350 ms |

The system provides improvements to other gesture based systems including but not limited to avoiding flaring/AEC changes in specific lighting conditions that may cause lockout and potential false triggers; gesture control methods which are flare/AEC independent; improved camera performance in dynamic lighting situations (including both high- and low-light); providing access to camera settings to enable image stability; and reducing both patterned and random noise within the camera, especially in low-light conditions in order to improve image noise limit sensitivity.

Figure 1:
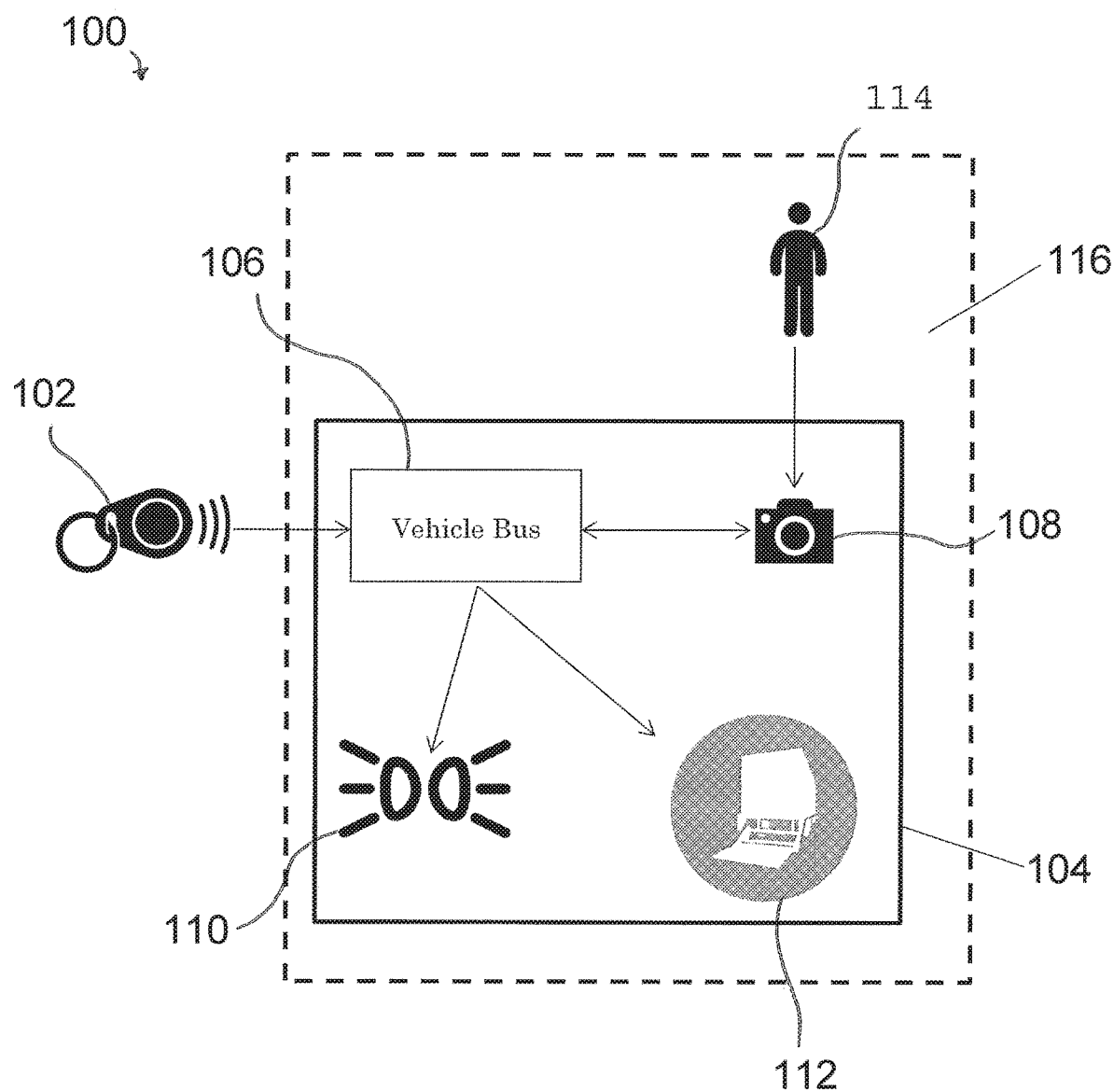
FIG. 1 is a schematic diagram of a camera-based hands free power liftgate system.

FIG. 1 is a schematic diagram of a camera-based hands free power liftgate system 100. The liftgate system 100 may include a key fob 102 and a vehicle system 104 that includes a vehicle bus 106, a camera system 108, a set of vehicle lights 110, and a liftgate 112. The liftgate 112 and a power liftgate warning chime (not depicted) may be part of a liftgate module.

In the embodiment set forth in the diagrams and described hereinafter, the vehicle owner key fob 102 may activate the vehicle bus 106 of the vehicle system 104 when the key fob 102 is in proximity to the vehicle, but that is just by way of example. The camera system 108 may activate based on a message signal from the vehicle bus 106 and may go into an "awaiting intent" mode. A vehicle user 114 may enter an activation zone 116 for 0.5 seconds to signal intent. The camera system 108 detects the approach of the user 114 in the activation zone 116 and confirms intent of the user 114. With intent confirmed, the user is provided a signal to initiate a gesture. In the present embodiment, the lights 110 of the vehicle system 104 may then flash, signaling that the vehicle system 104 is ready for gesture, but that is just by way of example.

The user 114 may then initiate a gesture such as, for example, a kick gesture. The power liftgate warning chime may then indicate a successful gesture, and the liftgate 112 may then open. The system 100 may then enter a standby and ready-to-close state. The user 114 may then deposit and/or remove items from a cargo area of the vehicle. The user 114 may then re-enter the activation zone 116 for 0.5 seconds to signal intent. The lights 110 of the vehicle system 104 may then flash, signaling the vehicle system 104 is ready for gesture. The user 114 may then initiate a gesture such as for example a kick gesture. The power liftgate warning chime may then indicate a successful gesture. The liftgate 112 may then close, and the camera system 108 may then go back to sleep mode. In one embodiment, the liftgate 112 may close if the key fob 102 is no longer in proximity to the vehicle for a specified period of time while the liftgate 112 is open.

If a valid gesture is not confirmed within a specified timeout period, a signal is sent to confirm timeout. In one embodiment, detection of the user 114 within the activation zone after a cool-down period may reinitializes intent by the vehicle system 104. In another embodiment, the vehicle system 104 will not reinitialize without the key fob 102 re-entering the activation zone 116. The key fob 102 leaving the activation zone 116 may end determination of intent by the vehicle system 104.

Figure 2:
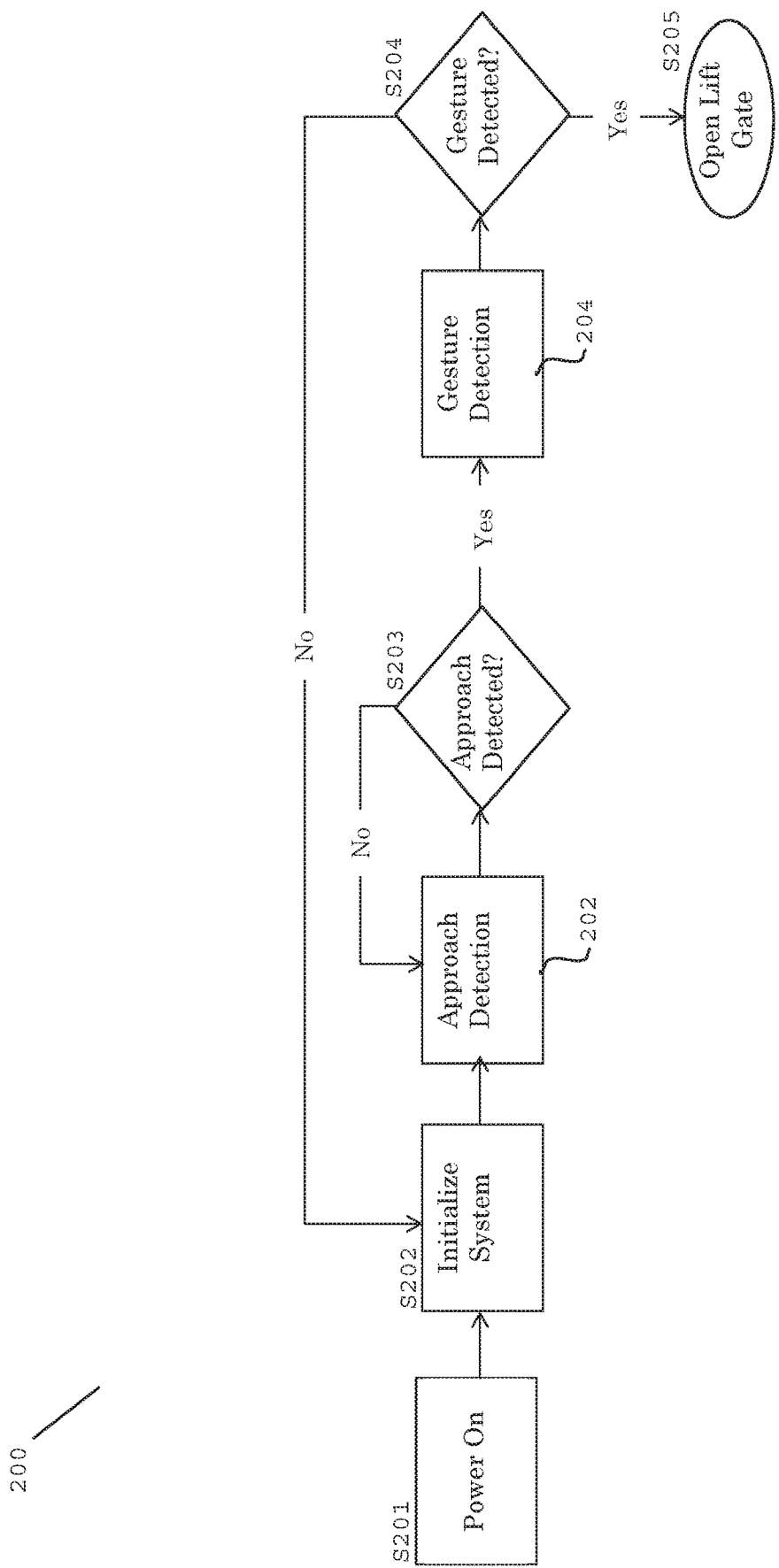
FIG. 2 is a block diagram of an example method for a camera based hands free power liftgate.

FIG. 2 is a diagram of an example method for a camera based hands free power liftgate 200. As an initial step, the vehicle is powered on (S201), thus initializing the vehicle system (S202). The vehicle system may include an approach detection feature 202 and a gesture detection feature 204. The approach detection feature 202 detects whether a vehicle user approaches the vehicle and is within the activation zone. The gesture detection feature detects whether the user has made a gesture to initiate the power liftgate.

The approach detection feature 202 therefore determines whether an approach by the vehicle user is detected (S203). If an approach is not detected, the approach detection feature 202 continues to detect for an approach. Once an approach is detected, the gesture detection feature 204 of the system may subsequently determine whether a gesture is detected (S204), using various methods of gesture detection. If a gesture is detected, the vehicle system may then open the liftgate (S205). If a gesture is not detected, the system proceeds back to initialization (S206), and the process is repeated until a gesture is detected.

Figure 3:
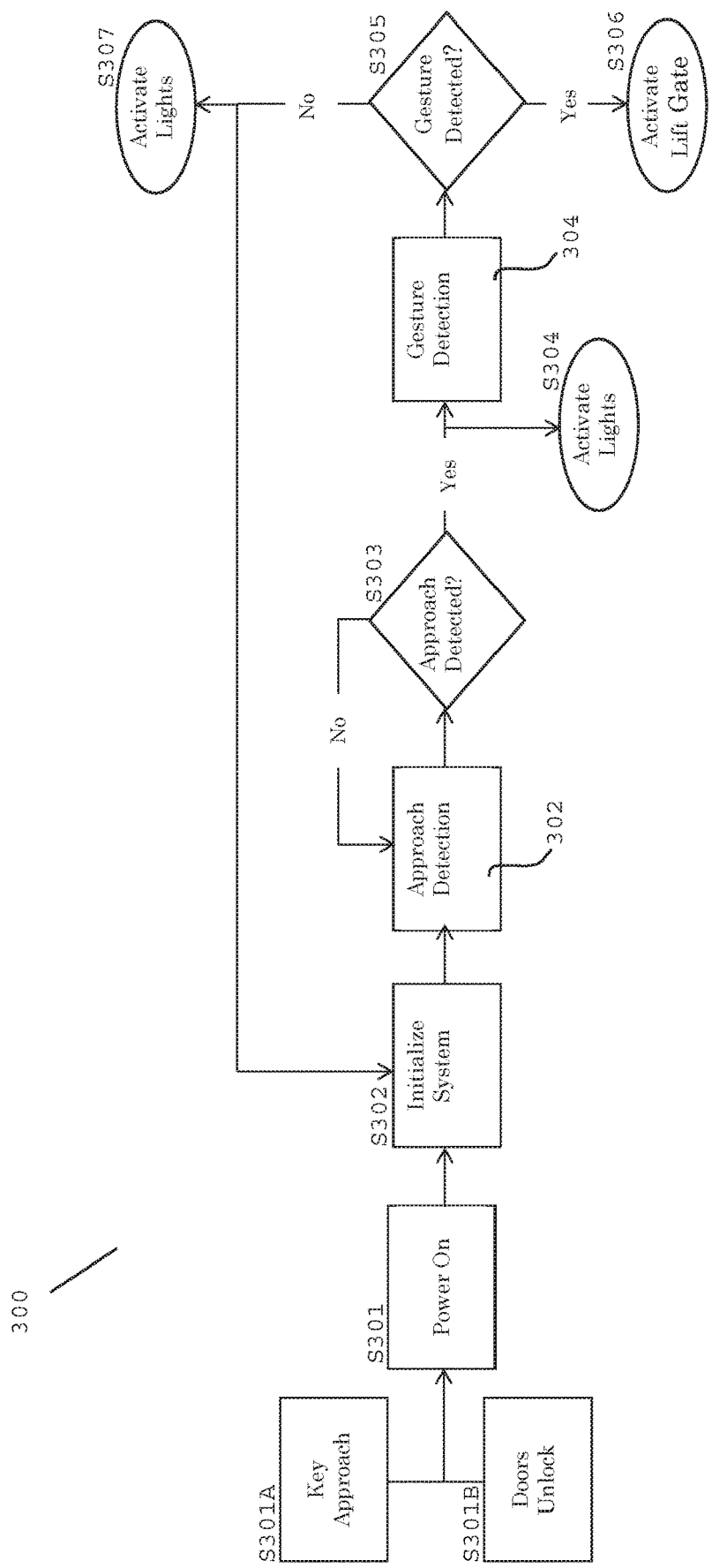
FIG. 3 is a block diagram of an example method for a camera based hands free power liftgate.

FIG. 3 is a diagram of an example method for a camera based hands free power liftgate 300 in accordance with another embodiment. As an initial step, the vehicle system may power on (S301) following a key approach (S301A). In one embodiment, a key fob may be used to power on or wake up the vehicle system as the key fob approaches within a specified proximity to the vehicle system. Entry within the specified proximity with a valid key fob may wake up a passive entry system via the vehicle bus. In another embodiment, the vehicle system may also be powered on when the doors of the vehicle are unlocked (S301B). The waking up and powering on of the vehicle system may also wake up the camera system and liftgate module.

The system may then initialize (S302). The approach detection feature 302 then begins to detect approaches by a user (S303). If an approach is not detected, the approach detection feature 302 continues to detect for an approach. Once an approach is detected, the vehicle system may activate the lights (S304). The gesture detection feature 304 of the system may then determine whether a gesture by the user is detected (S305). If a gesture is detected, the vehicle system may activate the liftgate (S306). If no gesture was detected, the vehicle system may activate the lights (S307) and the system may be initialized (S302) and the process (steps S302-S305) may be repeated until a gesture is detected and the vehicle system activates the liftgate (S306).

Figure 4:
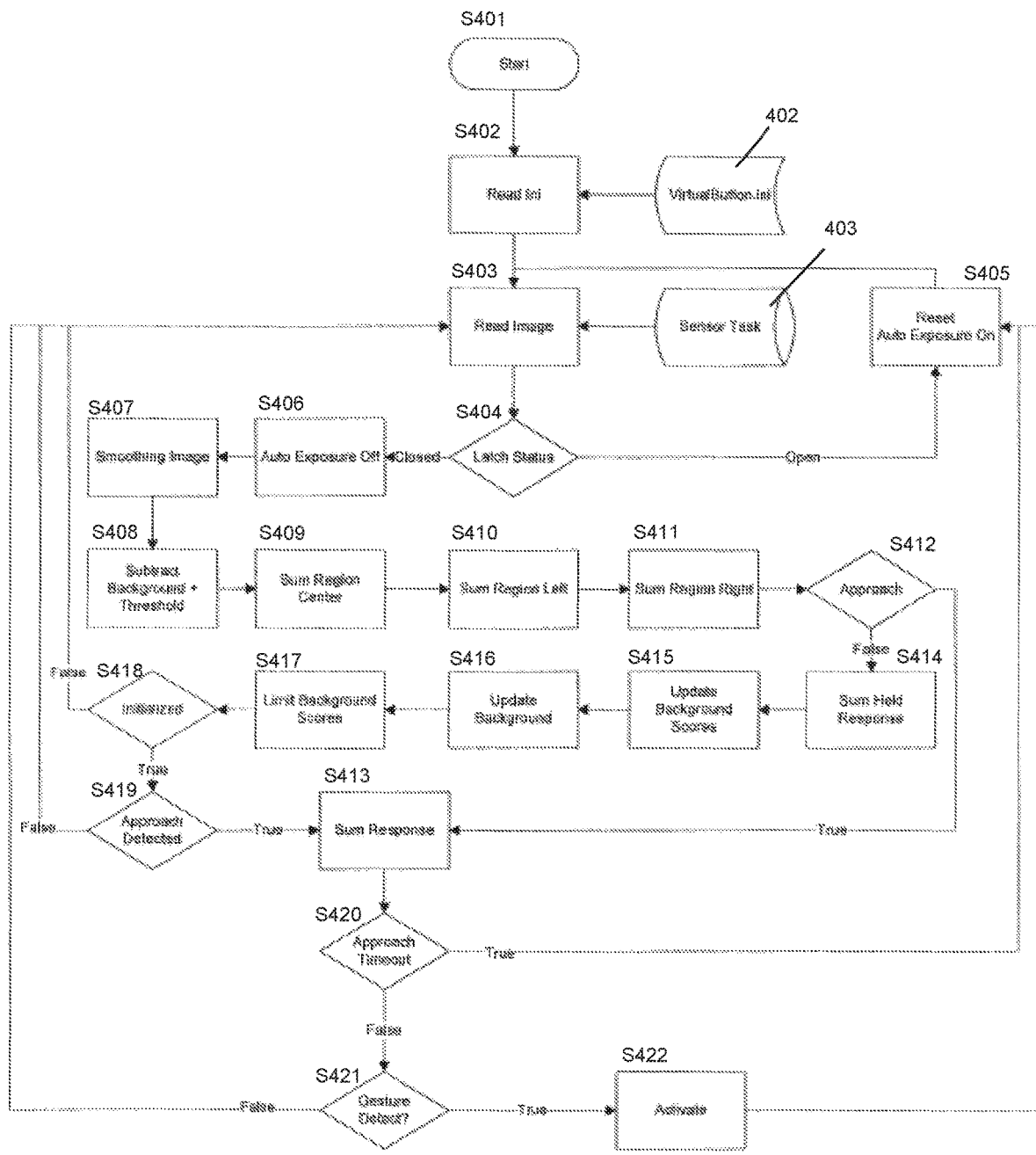
FIG. 4 is a block diagram of an example method for a camera based hands free power liftgate.

FIG. 4 is a diagram of an example method for a camera based hands free power liftgate vehicle system in accordance with another embodiment, which may be used in combination with all of the embodiments described herein. As an initial step, the system may start by powering on or waking up (S401). In one embodiment, the vehicle system may be powered on when the vehicle is powered on. In another embodiment, the vehicle system may power on following a key fob that triggers the vehicle system when it is within a range of the vehicle. In yet another embodiment, the vehicle system may also be powered on when the doors of the vehicle are unlocked.

The vehicle system may then initialize (S402). In the present embodiment as described hereinafter, the initialization may include obtaining parameters from an initialization file 402, but that is just by way of example. The system may then read an image by passing the image from a video buffer for processing (S403), which may include activating, controlling, and communicating with an image sensor 403. The system may then check a latch status based on the read image (S404). The latch status is configured to determine whether the liftgate is open when the latch is open or closed when the latch is closed.

If the latch is open, the system may reset auto exposure of the image, which may include resetting camera parameters including memory and enabling auto exposure to optimize the detected scene (S405), and subsequently reading the image again (S403). If the latch is closed, the system may then turn off auto exposure (S406), which may include disabling dynamic camera settings in order to minimize variability in the detected scene and fix the lighting environment around the camera. The system may then smooth the image to minimize noise/artifacts in the image (S407), and may subsequently subtract background and threshold to determine the moving features within the image (S408). The system may then determine feature sizes within a center region of the image (S409), determine the feature size within a left region of the image (S410), and then determine the feature size within a right region of the image (S411).

The system may then determine whether an approach has been detected (S412). In one embodiment, the system may determine an approach by subtracting the background of the read image and sampling and applying the feature sizes within the center, left, and right regions, but that is just by way of example. The system may use additional methods known in the art to determine whether an approach is detected. If an approach is detected, the system may then update gesture features (S413).

If an approach is not detected, the system may update detected features (S414), including updating background scores of the image by applying scene learning methods such as confidence in the learned scene (S415), updating the background by refreshing components out of confidence (S416); and subsequently limiting background scores by applying bounds to scene confidence (S417). The system may then determine whether initialization has occurred and whether the system successfully learned the scene and has checked the background (S418). If initialization has not occurred, the system may begin the process again at step S403 by reading an image. If initialization has occurred, then the system may determine whether an approach by an individual occurred by checking to see if the features match an approaching target (S419). If the approach is not detected (i.e. a false reading), the system may begin the process again at step S403 by reading an image. If the approach is detected, the system may update the gesture features in order to execute an additional response check (S413).

Once the system updates the gesture features, the system may continue checking the response to determine whether an individual is still interacting with the vehicle or whether the detected approach has timed out (S420). If the approach has timed out, the system may enter a safe mode and reset the auto exposure (S405). If the approach has not timed out, the system may then detect a gesture by checking for features matching a desired gesture (S421). If the features do not match a desired gesture, then the system may begin the process again at step S403 by reading a new image. If the features do match a desired gesture, then the system may activate and trigger the liftgate/portal (S422) and continue to read images.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method of activating a liftgate of a vehicle power liftgate system, the method comprising:
   powering on the vehicle power liftgate system in response to a message from a vehicle bus;
   initializing the vehicle power liftgate system;
   determining whether an approach is detected within an activation zone for a specified period of time, wherein the specified period of time is 10 ms-10000 ms;
   on a condition that an approach is detected within the activation zone for the specified period of time, activating lights of a vehicle to signal that the vehicle power liftgate system is ready for a gesture and determining whether a gesture is detected, wherein the approach is detected by a camera system;
   on a condition that a gesture is detected, activating the liftgate when a gesture is detected.

2. The method of claim 1, further comprising, on a condition that no gesture is detected, activating lights of the vehicle.

3. The method of claim 1, further comprising powering on the vehicle power liftgate system when doors of the vehicle unlock.

4. The method of claim 1, wherein the vehicle bus is activated when a key fob is in proximity to the vehicle.

5. The method of claim 1, wherein the lights of the vehicle are configured to flash when an approach is detected in the activation zone for the specified period of time.

6. The method of claim 1, wherein the gesture is a kick gesture.

7. The method of claim 1, wherein a liftgate warning chime indicates a successful gesture.

8. The method of claim 1, wherein the liftgate activating includes the liftgate opening.

9. The method of claim 1, wherein the vehicle power liftgate system enters a standby and ready to close state.

10. The method of claim 1, wherein the liftgate activating includes the liftgate closing.

11. The method of claim 1, wherein the camera system enters a sleep mode after the liftgate closes.

12. A method for use in a system, the method comprising:
    powering on the system in response to a vehicle's doors unlocking;
    initializing the system;
    determining whether an approach is detected within an activation zone for a specified period of time, wherein the specified period of time is 10 ms-10000 ms;
    on a condition that an approach is detected within the activation zone for the specified period of time, activating lights of the vehicle to signal that the system is ready for a gesture and determining whether a gesture is detected, wherein the approach is detected by a camera system; and
    on a condition that a gesture is detected, activating a liftgate of the vehicle.

13. The method of claim 12, further comprising, on a condition that no gesture is detected, activating lights of the vehicle when no gesture is detected.

14. The method of claim 12, further comprising:
    powering on the system in response to a bus message signal when a key fob is in proximity of a vehicle.

15. The method of claim 12, wherein a vehicle bus is activated when a key fob is in proximity to the vehicle.

16. The method of claim 12, wherein the lights of the vehicle configured to flash when an approach is detected in the activation zone for the specified period of time.

17. The method of claim 12, wherein the gesture is a kick gesture.

18. The method of claim 12, wherein a liftgate warning chime indicates a successful gesture.

19. The method of claim 12, wherein the liftgate activating includes the liftgate opening.

20. The method of claim 12, wherein the system enters a standby and ready to close state.

21. The method of claim 12, wherein the liftgate activating includes the liftgate closing.

22. The method of claim 12, wherein the camera system enters a sleep mode after the liftgate closes.

* * * * *

UNITED STATES PATENT AND TRADEMARK OFFICE
CERTIFICATE OF CORRECTION

| | |
|---|---|
| PATENT NO. | : 11,174,665 B2 |
| APPLICATION NO. | : 15/966515 |
| DATED | : November 16, 2021 |
| INVENTOR(S) | : Pompilian Tofilescu et al. |

It is certified that error appears in the above-identified patent and that said Letters Patent is hereby corrected as shown below:

In the Claims

In Claim 1, at Column 5, Line 42, after the words "specified period of time is" delete "10 ms–10000 ms" and insert therefor --10 ms–1000 ms--.

In Claim 12, at Column 6, Line 24, after the words "specified period of time is" delete "10 ms–10000 ms" and insert therefor --10 ms–1000 ms--.

Signed and Sealed this
Twenty-eighth Day of February, 2023

Katherine Kelly Vidal
*Director of the United States Patent and Trademark Office*